April 22, 1952 G. JAMES 2,593,760
PORTABLE BAND SAW
Filed March 24, 1950 2 SHEETS—SHEET 1
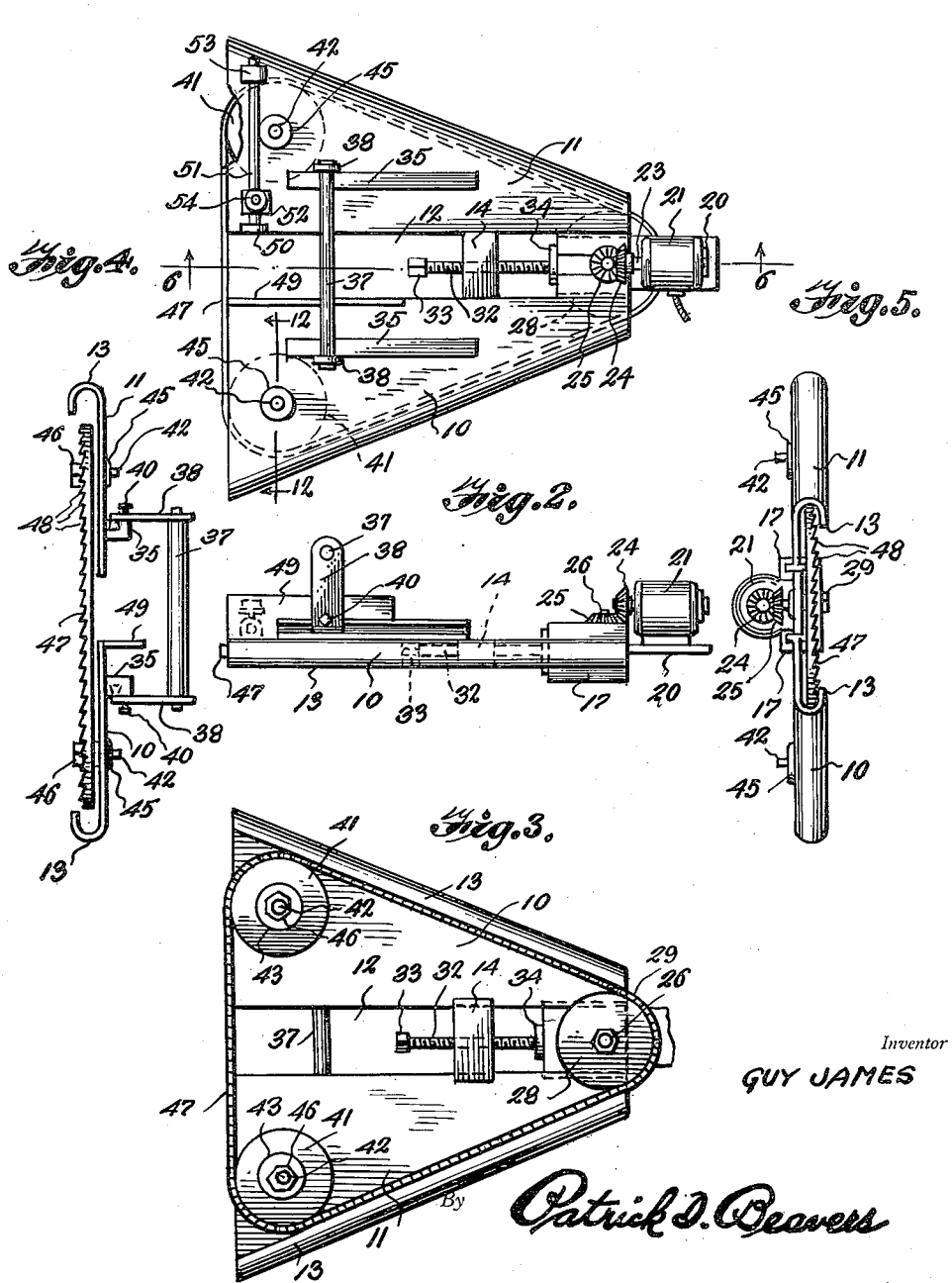
Inventor
GUY JAMES
By Patrick D. Beavers
Attorney

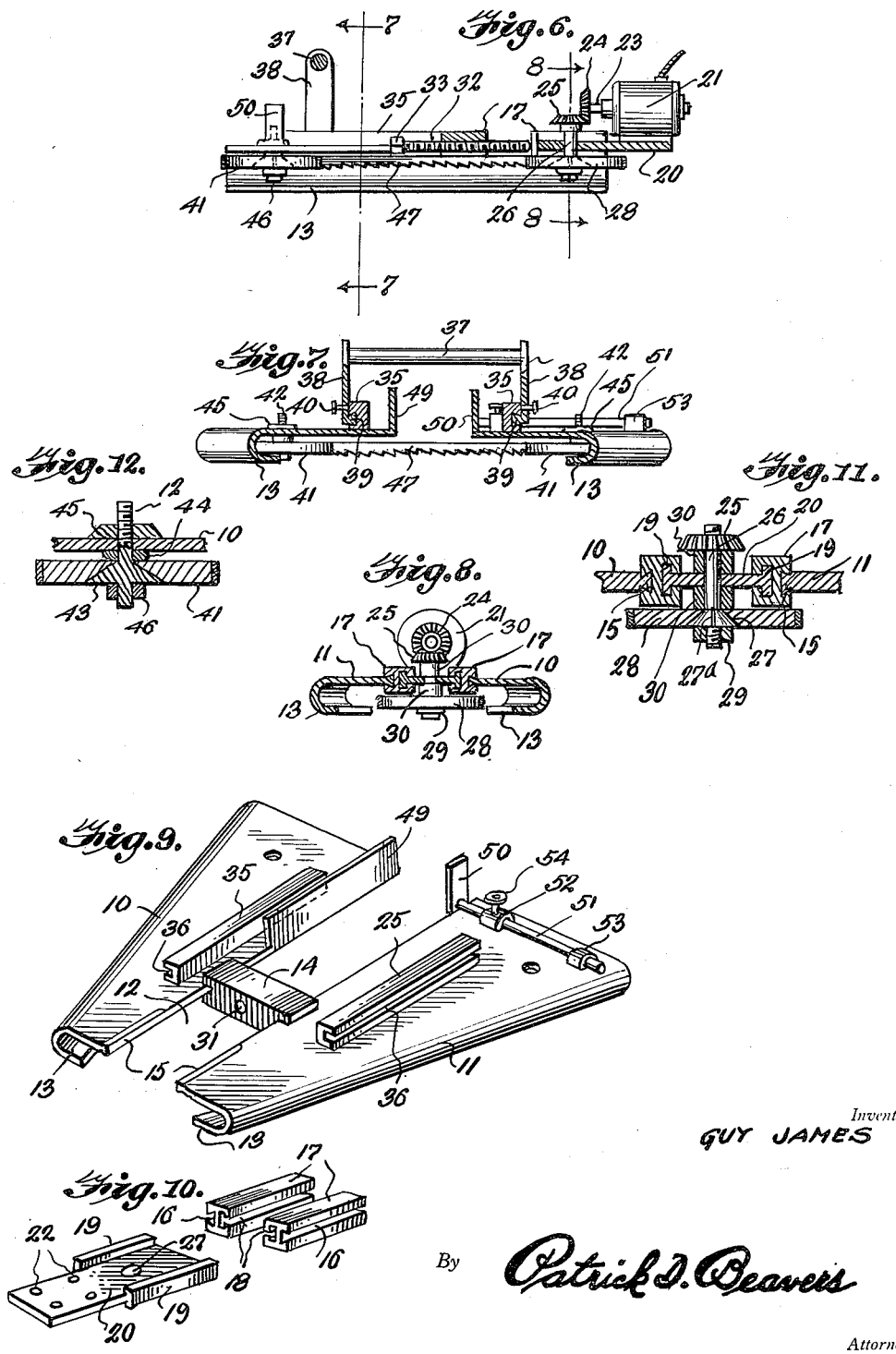

Patented Apr. 22, 1952

2,593,760

UNITED STATES PATENT OFFICE 2,593,760

PORTABLE BAND SAW

Guy James, Yakima, Wash.

Application March 24, 1950, Serial No. 151,667

1 Claim. (Cl. 143—21)

The present invention relates to a portable band saw and it consists in the combinations, constructions and arrangements of parts herein described and claimed.

Generally there is provided a portable band saw of generally triangular shape and having a body formed of sheet material the outer sides of which are bent to form protectors or guards against accidental cutting by the blade which consists of a ribbon-type saw which is trained over a drive pulley adjacent the apex of the triangular shape and over a pair of idler pulleys one mounted adjacent the outer end of the base of the triangular shaped body. The body is centrally divided to provide a trackway for a motor mounting and means is provided for tensioning the saw by moving the mounting of the motor which is, in turn, connected with the drive pulley. A novel adjustable handle is provided for the device and the device contains several other novel features which will be brought out herebelow.

It is accordingly an object of the invention to provide a device of the character set forth which is simple in construction, inexpensive to manufacture and yet effective and efficient in use.

Another object of the invention is the provision of a portable hand saw having novel tensioning means for a saw blade forming a part of the invention.

Another object of the invention is the provision of a novel adjustable handle construction forming a part of the invention.

A still further object of the invention is the provision of a novel mounting for a motor forming a part of the invention.

Another object of the invention is the provision of novel means for forming guards which guards likewise form a part of the invention.

A still further object of the invention is the provision of novel guide plates forming a part of the invention.

Other and further objects of the invention will become apparent from a reading of the following specification taken in conjunction with the drawings, in which:

Figure 1 is a plan view of an embodiment of the invention,

Figure 2 is a side elevational view of Figure 1,

Figure 3 is a bottom plan view of the device shown in Figures 1 and 2,

Figure 4 is an end elevational view taken from one end of the device shown in Figure 1, with a guide bar and shaft forming parts of the invention removed therefrom, Figure 5 is an end elevational view taken from the other end of the device shown in Figure 1, with a guide bar and shaft forming parts of the invention removed therefrom, Figure 6 is a sectional view taken along line 6—6 of Figure 1, Figure 7 is a sectional view taken along line 7—7 of Figure 6, Figure 8 is a sectional view taken along line 8—8 of Figure 6, Figure 9 is a perspective view of the body of the device together with certain parts attached thereto, Figure 10 is an exploded perspective view of certain elements forming a trackway and support for a motor, Figure 11 is an enlarged fragmentary sectional view likewise taken substantially along line 8—8 of Figure 6, and Figure 12 is a sectional view taken along line 12—12 of Figure 1.

Referring more particularly to the drawings, there is shown therein a body of sheet metal comprising a pair of complementary parts 10 and 11 together forming a generally triangular unit whose inner edges are spaced to provide a central passageway 12. The outer sides of the complementary body parts 10 and 11 are each bent downwardly and inwardly to form guard members 13 and the parts 11 and 10 are inter-connected by means of a block 14 which is welded or otherwise permanently affixed thereto and which traverses the passageway 12.

The rearward portions of the inner edges of the parts 10 and 11 are formed as keys, as indicated at 15 (Figures 9 and 11) and the keys 15 are each receivable in keyways 16 (Figure 10) formed in blocks 17 and preferably welded thereto. The inner faces of the blocks 17 are each provided with a trackway 18 in which rails 19 affixed to opposite sides of a platform 20 are adapted to ride.

An electric motor 21 is affixed to the platform 20 by bolts or the like extending through bolt holes 22 and is provided with a drive shaft 23 having a beveled gear 24 at its outer end. The gear 24 is enmeshed with a bevel gear 25 carried at the upper end of a shaft 26 which extends downwardly through an opening 27 provided in the platform and which has keyed thereto, as indicated at 27a, a drive pulley 28. A nut 29 is threaded upon the lower end of the shaft 26 to maintain the pulley 28 in proper position. Suitable bearings 30 surround the shaft 26 above and below the platform 20.

The block 14 is provided with a centrally disposed threaded opening 31 in which is threaded an elongated bolt 32 having a head 33 at its outer end carrying a plate 34 at its inner end. The plate 34 is adapted to bear against the forward side of the platform 20.

Adjacent the inner edges of the passageway 12 there is mounted a pair of elongated blocks 35 in parallel relation to each other. Each of the blocks is provided with a trackway 36 (Figure 9) in its outer face. A transversely extending handle 37 is provided at its outer ends with a pair of dependent arms 38 the lower end of each of which is provided with an inwardly extending projection 39 which is slidably mounted in one of the trackways 36. Each of the arms 38 is likewise provided with a set screw 40 which is adapted to bear against the block 35 with which is it associated to thereby lock the projection 39 in selected positions in the trackway 36.

Adjacent the forward outer end of each of the body parts 10 and 11 there is provided an idler pulley 41 which in each case is mounted upon a shaft 42 which extends through the associated body part 10 or 11 as the case may be and each of which is provided with an enlarged frusto-conically shaped portion 43 (Figure 12) which acts as a bearing for the pulley 41. A spacing washer 44 surrounds the shaft 42 between the body part and the pulley 41 and a nut 45 is threaded upon the shaft 42 above the body part 10 or 11 and a nut 46 is threaded upon the lower end of the shaft 42 adjacent the bearing portion 43 thereof.

A ribbon-type band saw 47 provided with downwardly directed teeth 48 is threaded over the outer peripheries of the two idler pulleys 41 and over the drive pulley 28. An upwardly extending integrally formed rider plate 49 extends from the forward inner edge of the part 10 to a point approximately midway thereof. A guide bar 50 whose surface is parallel to the surface of the guide plate 49, is mounted upon the inner end of a shaft 51 which extends through a pair of guide eyes 52 and 53 formed adjacent the forward edge of the part 11 and a set screw 54 extends vertically through the guide eye 52 and is adapted to bear against the shaft 51 to lock the same in selected positions.

In operation, it will be apparent that the saw 47 may be tensioned by turning the bolt 32 by means of its head 33 to thereby force the platform 20 rearwardly which as a consequence will move the associated drive pulley 28 rearwardly to thereby tighten the saw 47 thereon and upon the rider pulleys 41.

It will also be apparent that the handle 37 may be moved forwardly or rearwardly and locked in any selected position within the limits of the guideways 36 by manipulating the set screws 40. The guide plate 49 may be utilized in conventional manner to bear against one side of a piece of lumber to be cut by the saw 47 and the guide bar 50 may be positioned against the other side of such piece of lumber by moving the shaft 51 within the guide eyes 52 and 53 and thereafter locking the same in position by means of the set screw 54. It will be apparent that the motor 21 provides motive power for the saw 47 through its shaft 23, gears 24 and 25, the shaft 26 and the drive pulley 28 which is keyed to the shaft 26. It will also be seen that the device is entirely unitary in structure and that it may be easily and conveniently manipulated by means of the handle 37 and that the guards 13 will act to prevent accidental cutting of the operator or inadvertently cutting other pieces of lumber, it being understood that the forward portion of the saw 47 which extends across the base of the triangular body is the portion of the saw which is utilized during the operation thereof.

While but one form of the invention has been shown and described herein, it will be readily apparent to those skilled in the art that many minor modifications may be made without departing from the spirit of the invention or the scope of the appended claim.

What is claimed is:

A device of the character described comprising a substantially triangular frame having a passageway extending centrally therethrough from the apex thereof, an idler pulley mounted adjacent each end of the base of the frame, a platform slidably and adjustably mounted in the passageway adjacent the apex end of the frame, a drive pulley carried by the platform, a motor mounted upon the platform, drive means interconnecting the motor and the drive pulley, a band saw entrained over all of said pulleys, a saw guard integrally formed in each of the sides of the triangular frame, a work guide plate formed integrally with the frame at one side of the passageway at the base of the frame, a work guide bar laterally and adjustably carried by the frame at the other side of the passageway in parallel opposed relation to the work guide plate, a pair of parallel spaced rails carried by the frame perpendicularly to the base thereof and on each side of said passageway, said rails each having a longitudinal groove in the outer side thereof, a handle extending in a direction parallel to the base of the frame, a leg at each end of said handle, said legs each having an inturned outer end slidably engaged in one of said grooves, and a set screw extending through each leg and adapted to bear against its adjacent rail.

GUY JAMES.

REFERENCES CITED

The following references are of record in the file of this patent:

UNITED STATES PATENTS

| Number | Name | Date |
|---|---|---|
| 482,103 | Speer | Sept. 6, 1892 |
| 1,530,682 | Lyman | Mar. 24, 1925 |
| 2,511,989 | Nardi | June 20, 1950 |

FOREIGN PATENTS

| Number | Country | Date |
|---|---|---|
| 718,009 | France | Oct. 26, 1931 |